United States Patent
DeLuca

(10) Patent No.: US 11,321,641 B2
(45) Date of Patent: May 3, 2022

(54) MANAGING SEAT OCCUPANCY DETAILS OF ONE OR MORE PASSENGERS

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 176 days.

(21) Appl. No.: 16/107,947

(22) Filed: Aug. 21, 2018

(65) Prior Publication Data
US 2020/0065717 A1    Feb. 27, 2020

(51) Int. Cl.
*G06V 20/59* (2022.01)
*G06Q 10/02* (2012.01)
*G06Q 50/30* (2012.01)

(52) U.S. Cl.
CPC ............ *G06Q 10/02* (2013.01); *G06Q 50/30* (2013.01); *G06V 20/593* (2022.01)

(58) Field of Classification Search
CPC .... G06Q 10/02; G06Q 50/30; G06K 9/00838; G08B 3/10; G08B 5/22; H05B 37/02
See application file for complete search history.

(56) References Cited

U.S. PATENT DOCUMENTS

| 8,981,896 B2 * | 3/2015 | Smith | G07F 17/42 340/5.42 |
| 9,024,752 B2 * | 5/2015 | Tumayan | G08G 1/123 340/539.13 |
| 9,254,917 B2 * | 2/2016 | Hau | G06Q 10/08 |

(Continued)

FOREIGN PATENT DOCUMENTS

| CN | 105469623 A | * | 4/2016 | |
| DE | 102012000719 A1 | | 5/2013 | |
| EP | 3012794 A1 | * | 4/2016 | ............ G06Q 30/02 |

(Continued)

OTHER PUBLICATIONS

"Security Review—Amtrak Ticket Checks," by Alex T. Wainger, Feb. 3, 2015 (Year: 2015).*
"Covid19: Managing Passenger Density with Infodev EDI-APC Advanced Passenger Counting and AIIIM Seat & Space Occupation Systems," Rolling Stock Networking, Jun. 16, 2020 (Year: 2020).*

(Continued)

*Primary Examiner* — George Chen
*Assistant Examiner* — Brian Adams Heflin
(74) *Attorney, Agent, or Firm* — David Spalding

(57) ABSTRACT

A computer-implemented method for managing seat occupancy details of one or more passengers. The method includes receiving seat occupancy details of the one or more passengers associated with one or more seats, wherein the received seat occupancy details of the one or more passengers includes destination information of the one or more passengers. The method further includes retrieving a seating chart for a transit venue from a database, updating the seating chart for the transit venue based on the seat occupancy details of the one or more passengers, and displaying the seating chart, together with the seat occupancy details of the one or more passengers, on a computing device. The received seat occupancy details of the one or more passengers may be depicted on the seating chart by use of one or more distinct visualizations associated with the one or more seats.

14 Claims, 7 Drawing Sheets

(56) References Cited

U.S. PATENT DOCUMENTS

| | | | |
|---|---|---|---|
| 9,302,781 B2* | 4/2016 | Jouper | B64D 11/06 |
| 9,694,725 B2 | 7/2017 | Watson et al. | |
| 9,870,585 B2 | 1/2018 | Cronin et al. | |
| 10,482,752 B2* | 11/2019 | Griffiths | B61D 41/00 |
| 2011/0098908 A1* | 4/2011 | Chun | B61B 1/00 |
| | | | 701/117 |
| 2011/0313821 A1* | 12/2011 | Hilton | G07B 15/00 |
| | | | 705/13 |
| 2012/0242492 A1* | 9/2012 | Grunfeld | G08B 21/24 |
| | | | 340/667 |
| 2013/0231965 A1* | 9/2013 | Tokatly | G06Q 10/02 |
| | | | 705/5 |
| 2014/0125355 A1* | 5/2014 | Grant | G01R 27/2605 |
| | | | 324/629 |
| 2015/0142483 A1 | 5/2015 | Bergdale et al. | |
| 2016/0337453 A1* | 11/2016 | Lee | H04L 67/327 |
| 2016/0381205 A1* | 12/2016 | You | H04M 1/72569 |
| | | | 455/418 |
| 2017/0182957 A1 | 6/2017 | Watson et al. | |
| 2017/0293950 A1* | 10/2017 | Rathod | G06Q 30/02 |
| 2018/0069817 A1* | 3/2018 | Constantinides | H04L 51/20 |
| 2019/0236322 A1* | 8/2019 | Arquero | B61D 41/00 |

FOREIGN PATENT DOCUMENTS

| | | |
|---|---|---|
| GB | 2424743 A | 10/2006 |
| KR | 101674480 B1 * | 11/2016 |
| WO | 2015090328 A1 | 6/2015 |

OTHER PUBLICATIONS

"Here's What Your Flight Cabin Crew Can See On Their iPads," by Gilbert Ott, Jul. 3, 2020 (Year: 2020).*

"Here's All the Information Cabin Crew Can See About You on Their iPads When You Fly," by Cailey Rizzo, Oct. 8, 2019 (Year: 2019).*

"How does a flight attendant know your birthday? Big data playing bigger role as airlines personalize service," by Lauren Zumback, Jul. 15, 2018 (Year: 2018).*

Anonymous, "Seat Reservation System," An IP.com Prior Art Database Technical Disclosure, May 17, 2010, p. 1-3, IP.com No. IPCOM000195795D.

Mell et al., "The NIST Definition of Cloud Computing," National Institute of Standards and Technology, Sep. 2011, p. 1-3, Special Publication 800-145.

* cited by examiner

MANAGING SEAT OCCUPANCY DETAILS OF ONE OR MORE PASSENGERS

BACKGROUND

Embodiments of the present invention relate generally to the field of computing and more particularly to data processing and managing seat occupancy details of one or more passengers.

When riding in a passenger vehicle (e.g., like a bus, or a train), a ticket collector walks through the aisles to see the passengers' tickets for proof of purchase. As a result, the ticket collector has to remember which passengers they have already checked, or ask passengers multiple times for their ticket, especially if a passenger changes seats during their ride. This method also requires the passengers to wait around for the ticket collector to check their ticket before they can put away their smart phone, if an electronic ticket, or their paper ticket.

Additionally, a passenger may stay on the passenger vehicle for more stops than they paid for, either accidentally (e.g., fell asleep) or intentionally (e.g., to avoid paying a more expensive fare).

Currently, there is no available service that would allow a ticket collector to see which passengers have paid for their ride, and whether they exited from the passenger vehicle at the paid-for destination, without having to manually go to the passengers' seat and check their ticket.

SUMMARY

Embodiments of the invention include a method, computer program product, and system, for managing seat occupancy details of one or more passengers.

A method, according to an embodiment, for managing seat occupancy details of one or more passengers includes receiving seat occupancy details of the one or more passengers associated with one or more seats, retrieving a seating chart for a transit venue from a database, updating the seating chart for the transit venue based on the seat occupancy details of the one or more passengers, and displaying the seating chart, together with the seat occupancy details of the one or more passengers, on a computing device.

A computer program product, according to an embodiment of the invention, includes a non-transitory tangible storage device having program code embodied therewith. The program code is executable by a processor of a computer to perform a method. The method includes receiving seat occupancy details of the one or more passengers associated with one or more seats, retrieving a seating chart for a transit venue from a database, updating the seating chart for the transit venue based on the seat occupancy details of the one or more passengers, and displaying the seating chart, together with the seat occupancy details of the one or more passengers, on a computing device.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving seat occupancy details of the one or more passengers associated with one or more seats, retrieving a seating chart for a transit venue from a database, updating the seating chart for the transit venue based on the seat occupancy details of the one or more passengers, and displaying the seating chart, together with the seat occupancy details of the one or more passengers, on a computing device.

DETAILED DESCRIPTION

As previously described, existing ticket collection processes are manual processes which leave room for error and cause inconveniences. Straphangers can relate to the inconvenience of waiting for a ticket collector to walk the aisle of a train to see their ticket, especially if the ticket collector needs to come back multiple times to confirm one's ticket and destination. What is needed is a way for passengers to mark their seat as paid/occupied before the ticket collector needs to ask for their ticket.

The subject invention allows for a visual representation of the passengers' seat details on a ticket collector's mobile device, together with additional passenger information, thereby streamlining the onboarding ticketing process, as well as improving customer service tailored to specific passengers. For example, the subject invention may alert the passenger to their upcoming train stop, alert the ticket collector about a damaged seat or a passenger that missed their stop, and even notify the ticket collector about unhappy passengers.

The subject invention may be offered to customers of many types of transportation. Some examples may include bus companies, train companies, airline companies, public transit, restaurants, cruise lines, and hotel chains just to name a few.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
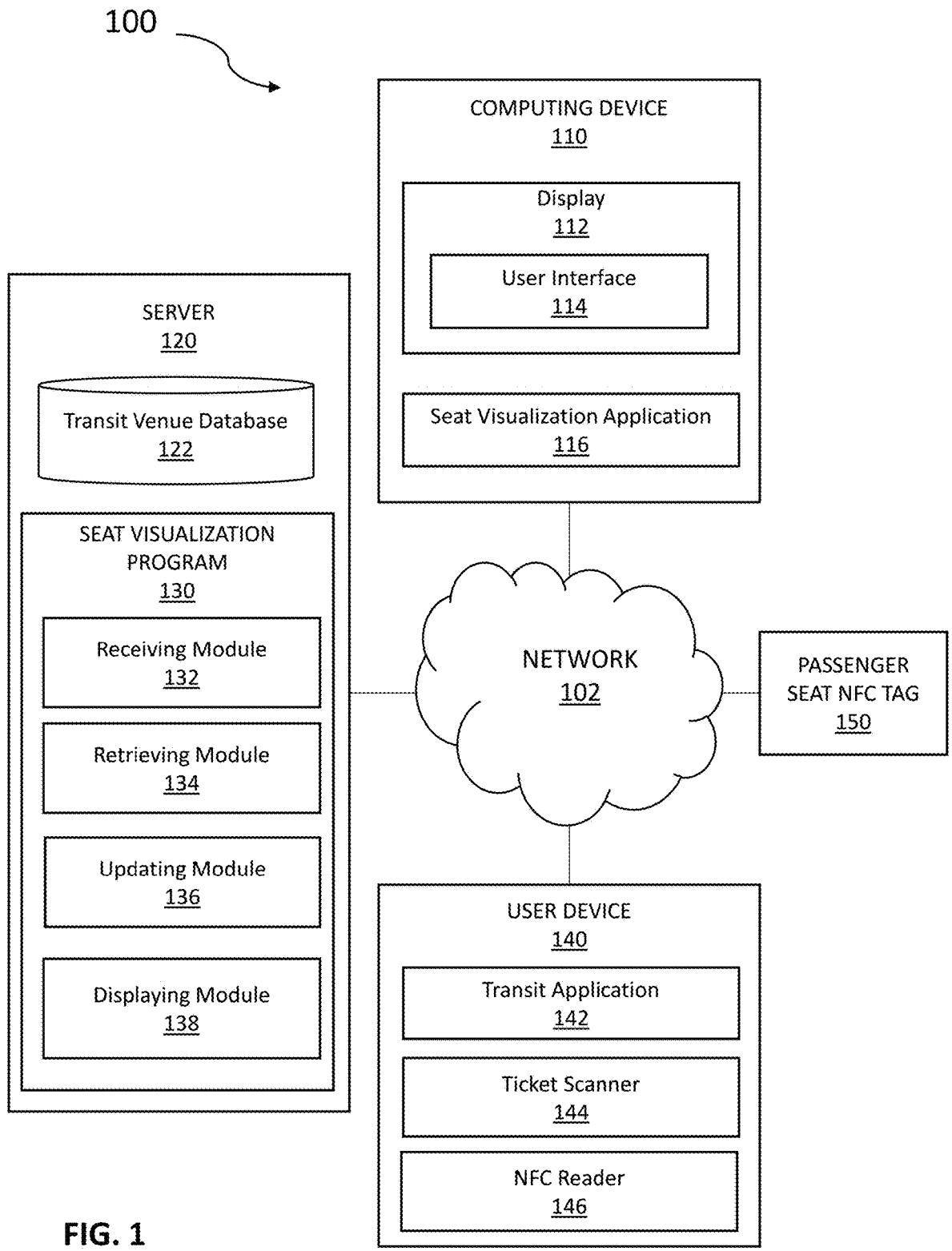
FIG. 1 illustrates a seat visualization computing environment, in accordance with an embodiment of the present invention.

FIG. 1 illustrates seat visualization computing environment 100, in accordance with an embodiment of the present invention. Seat visualization computing environment 100 includes computing device 110, server 120, user device 140, and passenger seat near-field communication (NFC) tag 150, all connected via network 102. The setup in FIG. 1 represents an example embodiment configuration for the present invention, and is not limited to the depicted setup in order to derive benefit from the present invention.

In an exemplary embodiment, computing device 110 contains display 112, user interface 114, and seat visualization application 116. In various embodiments, computing device 110 may be a laptop computer, tablet computer, netbook computer, personal computer (PC), a desktop computer, a personal digital assistant (PDA), a smart phone, or any programmable electronic device capable of communicating with server 120, user mobile device 140, and passenger seat NFC tag 150, via network 102. Computing device 110 may include internal and external hardware components, as depicted and described in further detail below with reference to FIG. 6. In other embodiments, computing device 110 may be implemented in a cloud computing environment, as described in relation to FIGS. 7 and 8, herein. Computing device 110 may also have wireless connectivity capabilities allowing it to communicate with server 120, user device 140, and passenger seat NFC tag 150, as well as other computers or servers over network 102.

In an exemplary embodiment, display 112 receives data from seat visualization application 116 and displays the seating chart for a transit venue, together with the seat occupancy details of the one or more passengers. The seat occupancy details may include an origination location and destination location of a passenger, amongst other details. The seat occupancy details of a passenger may be displayed, within the seating chart, on computing device 110 in various forms: in writing, in color-code, or in any other fashion one skilled in the art may determine. Display 112 may be connectively coupled to hardware components, such as those depicted in FIG. 6, for displaying user input and/or received data.

In an exemplary embodiment, user interface 114 may be a computer program that allows a user to interact with computing device 110 and other connected devices via network 102. For example, user interface 114 may be a graphical user interface (GUI). In addition to comprising a computer program, user interface 114 may be connectively coupled to hardware components, such as those depicted in FIG. 6, for receiving user input. In an exemplary embodiment, user interface 114 may be a web browser, however in other embodiments user interface 114 may be a different program capable of receiving user interaction and communicating with other devices.

In an exemplary embodiment, seat visualization application 116 may be a web browser or other computer program, on computing device 110, that is capable of receiving real-time data from seat visualization program 130 on server 120. Seat visualization application 116, in an exemplary embodiment, may be capable of accessing transit venue database 122 to view seat occupancy details for a particular transit venue (e.g., train, bus, airplane, etc.) for a particular transit route. In an alternative embodiment, seat visualization application 116 may contain a seating chart for the transit venue, together with available seats for purchase within the seating chart.

In an exemplary embodiment, seat visualization application 116 receives populated seat occupancy data for a particular transit venue, from seat visualization program 130, and displays the received data in real-time on display 112.

With continued reference to FIG. 1, server 120 contains transit venue database 122 and seat visualization program 130, and may be a laptop computer, tablet computer, netbook computer, personal computer (PC), a desktop computer, a personal digital assistant (PDA), a smart phone, or any programmable electronic device capable of communicating with computing device 110, user mobile device 140, and passenger seat NFC tag 150, via network 102. While server 120 is shown as a single device, in other embodiments, server 120 may be comprised of a cluster or plurality of computing devices, working together or working separately. In a preferred embodiment, server 120 may be implemented in a cloud computing environment, as described in relation to FIGS. 7 and 8, herein.

In an exemplary embodiment, transit venue database 122 is a database storage that contains the seating charts for various transit venues. For example, transit venue database 122 may include the seating chart for a train, a bus, an airplane, a cruise ship, a blimp, a hot air balloon, a rollercoaster, and any other seating arrangement where a passenger must present a ticket to ride. In alternative embodiments, seat visualization program 130 may be applied to other types of venues, such as theatres, concert halls, and any other type of venue that contains stationary seating arrangements. Transit venue database 122, in exemplary embodiments, is capable of being updated dynamically based on information received from user mobile device 140, passenger seat NFC tag 150, or by any other means of tracking an individual's location and transmitting the individual's location to seat visualization program 130, known to one of ordinary skill in the art.

In exemplary embodiments, transit venue database 122 may store transit venue templates as data objects according to a type of transit venue (e.g., bus, train, airplane), a corresponding route (e.g., 9 am express bus down Flatbush Ave; 10:15 am train shuttle from Penn Station to DC; 11 pm redeye flight from Chicago O'Hare to LAX), a transit venue name (e.g., well-known bus company, train company, or airline), a specific row and seat number (e.g., row 12, seat 3) or any other category or organization deemed most useful for the invention to be utilized. For example, a transit venue data object may be stored as <train2, 9:15 am, Penn, rowX, seatY>. When a passenger's user device 140 is associated with a particular seat within the transit venue, as discussed further below, the "rowX" and "seatY" are populated.

In exemplary embodiments, transit venues and specific routes may be updated to transit venue database 122 in real-time. Furthermore, as discussed herein, a passenger's "row" and "seat" may also be updated in real-time when a user changes their seat location.

In various embodiments, transit venue database 122 may be capable of being stored on server 120, computing device 110, or seat visualization program 130, as a separate database.

In an exemplary embodiment, seat visualization program 130 contains instruction sets, executable by a processor, which may be described using a set of functional modules. The functional modules of seat visualization program 130 may include receiving module 132, retrieving module 134, updating module 136, and displaying module 138.

In an exemplary embodiment, user device 140 includes transit application 142, ticket scanner 144, and NFC reader 146, and may be a laptop computer, tablet computer, netbook computer, personal computer (PC), a desktop computer, a personal digital assistant (PDA), a smart phone, a server, a wearable device, or any programmable electronic device capable of communicating with computing device 110, server 120, and passenger seat NFC tag 150, via network 102. While user device 140 is shown as a single device, in other embodiments, user device 140 may be comprised of a cluster or plurality of computing devices, working together or working separately.

In an exemplary embodiment, transit application 142 may be a web browser or other computer program, on user device 140, that is capable of receiving a passenger's e-ticket information or a passenger's paper ticket information, via ticket scanner 144, and additionally receiving real-time seat occupancy details of a passenger for a particular transit venue, based on NFC reader's 146 communication with passenger seat NFC tag 150. Transit application 142, in an exemplary embodiment, may be capable of transmitting the real-time seat occupancy details of the passenger, for a particular transit venue (e.g., train, bus, airplane, etc.) on a particular route, to seat visualization program 130.

In an exemplary embodiment, ticket scanner 144 may be a computer program, on user device 140, that can read and output printed barcodes or QR codes, such as a passenger ticket barcode label, to a computing device, such as user device 140. In an exemplary embodiment, ticket scanner 144 may be a component of transit application 142.

In exemplary embodiments, a passenger ticket barcode label, or QR code, may contain information such as the price of the ticket, the valid dates of use for the ticket, the passenger's origination and destination, the valid transit venue for use of the passenger ticket, and any other relevant data pertaining to the ticket purchase.

In an exemplary embodiment, NFC reader 146 may be a component on user device 140 that is capable of communicating with passenger seat NFC tag 150. In alternative embodiments, user device 140 may communicate with a passenger seat within a public transit venue via Bluetooth® (Bluetooth and all Bluetooth-based trademarks and logos are trademarks or registered trademarks of Bluetooth SIG, Inc. and/or its affiliates), Wireless Fidelity (WiFi), Radio-Frequency Identification (RFID), and any other wireless radio communication standard known to one of ordinary skill in the art. The purpose of NFC reader 146, or any other wireless radio communication standard associated with user device 140, is to associate a passenger with a specific passenger seat NFC tag 150 (e.g., a specific row number and seat number) within a transit venue (e.g., bus, train, plane, etc.). In exemplary embodiments, the passenger's ticket information, together with the detected passenger seat, may be transmitted to seat visualization program 130, via transit application 142, over network 102.

In exemplary embodiments, passenger seats within a transit venue may be outfitted with a passenger seat NFC tag 150. Passenger seat NFC tag 150 is capable of communicating with NFC reader 146, on user device 140, thereby associating user device 140 with a particular seat (e.g., a specific row number and seat number) within the transit venue seating chart. In exemplary embodiments, a passenger may be required to hold their user device 140, containing NFC reader 146, within a certain range of the passenger seat NFC tag 150 in order to be recognized. In alternative embodiments, such as with Bluetooth® or WiFi, a user device 140 may be automatically detected when a user occupies a particular seat within the transit venue.

Figure 2:
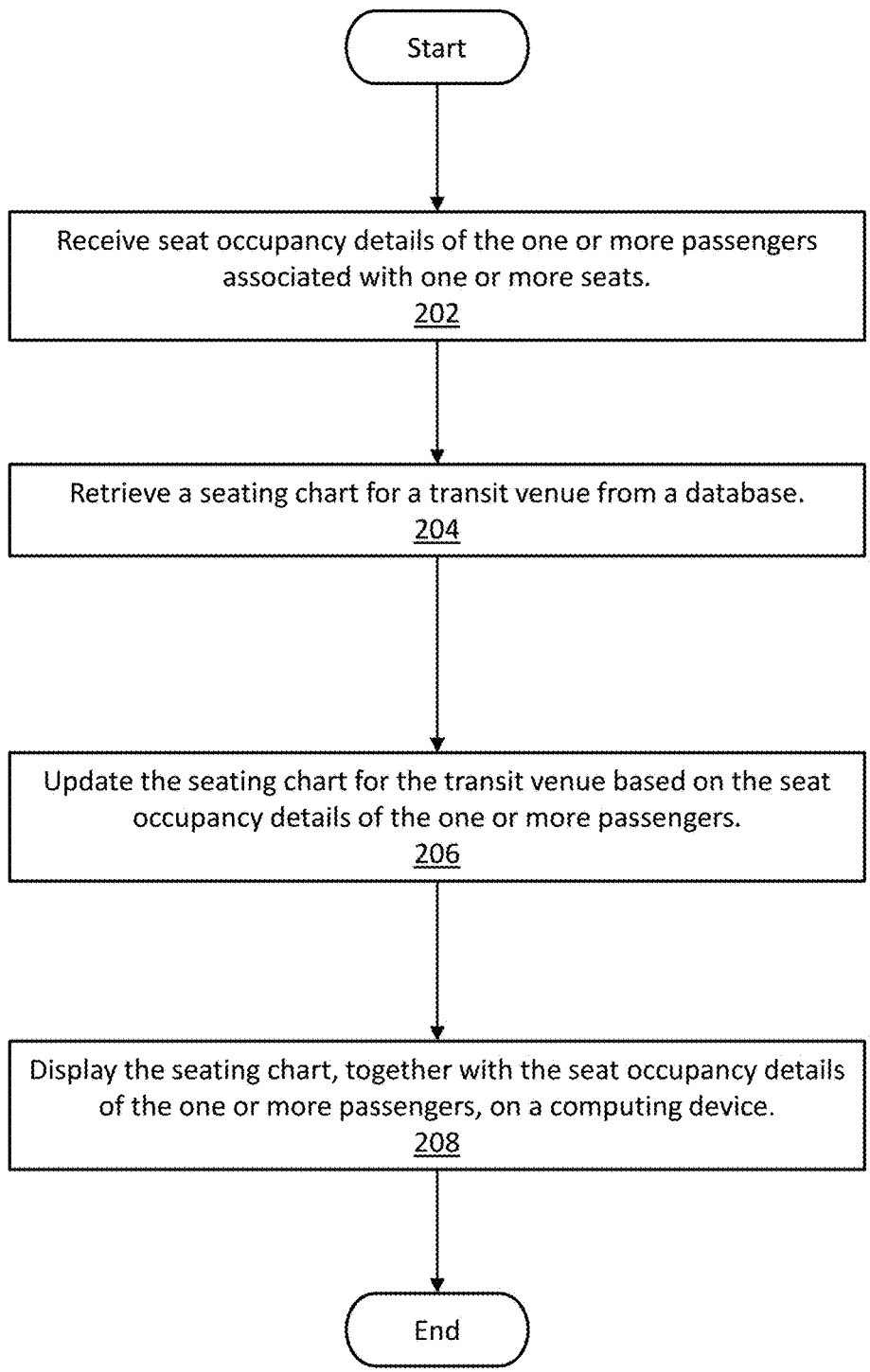
FIG. 2 is a flowchart illustrating the operation of seat visualization program 130, in accordance with an embodiment of the present invention.

FIG. 2 is a flowchart illustrating the operation of seat visualization program 130, in accordance with an embodiment of the present invention.

Referring now to FIGS. 1 and 2, receiving module 132 includes a set of programming instructions in seat visualization program 130. The set of programming instructions is executable by a processor. Receiving module 132 receives seat occupancy details of the one or more passengers associated with one or more seats, over a wireless network via a wireless receiver associated with the one or more seats (step 202).

In exemplary embodiments, seat occupancy details of the one or more passengers associated with one or more seats may include any one or more of the following: origination information of the one or more passengers, destination information of the one or more passengers, time until destination of the one or more passengers, number of remaining stops until destination of the one or more passengers, missed destination of the one or more passengers, and no checked-in status of the one or more passengers. Origination information and destination information of the one or more passengers is obtained from scanning a passenger's ticket via ticket scanner 144 on user device 140, and transmitted to seat visualization program 130, via network 102. Additional seat occupancy details may include the transit venue, and the passenger's detected row and seat number within the transit venue.

With reference to an illustrative example, Anna lives and works in Maryland and is taking the local commuter train from Baltimore to Washington, D.C. for a speaking engagement. Anna purchased her paper ticket from the train station ticket counter in Baltimore. Typically, she would have to wait for the ticket collector on the train to come around and take her ticket. However, embodiments of the present invention enable Anna to use her smart phone (user device 140) to scan her train ticket with ticket scanner 144 rather than having to wait for the ticket collector. The information contained within Anna's train ticket includes the origination and destination train stations, which identifies the local commuter train from Baltimore to Washington, D.C. Receiving module 132 associates the local commuter train (transit venue) that Anna is riding on, together with Anna's detected row number, seat number, origination station, and destination station information.

In exemplary embodiments, the received seat occupancy details of the one or more passengers may be depicted, on the seating chart for the transit venue (i.e., seat visualization application 116), by use of one or more distinct visualizations associated with the one or more seats. One or more distinct visualizations may include various shades of a color, a pattern, an animation, some text, a hover effect, a graphic such as an icon, and any other distinct visualization known to one of ordinary skill in the art. For example, received origination information of the one or more passengers may be depicted by various shades of the color yellow; destination information of the one or more passengers may be depicted by various shades of the color green; and no checked-in status of the one or more passengers may be depicted by the color red, and so forth.

In various embodiments, seat visualization application 116 may depict the seating chart for a transit venue that includes multiple passengers going to multiple different destinations. The multiple passengers going to multiple different destinations may all be represented by different colors within the seating chart, in order to better identify those passengers that need to exit the train and those that remain, with each successive stop. Passenger seat detection, within the present invention, is not limited to color coded designations.

In alternative embodiments, seat visualization program 130 may depict the various destinations of the various passengers, on seat visualization application 116, via capital letters associated with particular passenger seats. For example, a passenger going to Queens who is sitting in row 3, seat 5 may be depicted as "Q", and a passenger going to Staten Island who is sitting in row 15, seat 7 may be depicted as "S". The designation of a key for an assigned passenger seat, within a seating chart for a transit venue, is only limited to the creativity of one skilled in the art.

In exemplary embodiments, those passengers that have not used their user device 140 to provide ticketing information or are otherwise automatically verified as holding a valid ticket, but are detected as sitting in a passenger seat within the transit venue, may be depicted by the color red (or any other designation that serves to adequately identify a passenger, as discussed above) within seat visualization application 116.

In exemplary embodiments, receiving module 132 may determine that the one or more seats, within the seating chart for the transit venue, are occupied by one or more passengers based on weight sensors contained within the one or more seats. In alternative embodiments, receiving module 132 may determine that the one or more seats, within the seating chart for the transit venue, are occupied by one or more passengers based on cameras, audio, sensors, or any other technology known to one of ordinary skill in the art, associated with the one or more seats.

Using seat sensors to determine whether a passenger seat is occupied or not may help the ticket collector realize that there are no tickets to manually scan despite not all seats being checked-in. In other words, the ticket collector would be able to see the number of empty seats via seat visualization application 116.

With continued reference to FIGS. 1 and 2, retrieving module 134 includes a set of programming instructions in seat visualization program 130. The set of programming instructions is executable by a processor. Retrieving module 134 retrieves a seating chart for a transit venue from transit venue database 122 (step 204). In exemplary embodiments, retrieving module 134 may retrieve a seating chart for a transit venue from transit venue database 122, a database stored locally on computing device 110, or directly from seat visualization application 116. In alternative embodiments, retrieving module 134 may receive a seating chart from any other third party device or database.

In exemplary embodiments, retrieving module 134 retrieves the seating chart template from transit venue database 122 based on the received ticket information of one or more passengers.

With continued reference to the illustrative example above, seat visualization program 130 identifies Anna's received passenger train ticket with the 10 am express train from Baltimore to Washington, D.C. and retrieves the appropriate seating chart, via retrieving module 134, contained within transit venue database 122, and populates Anna's detected row and seat number with an identifier such as a color dot.

Figure 3:
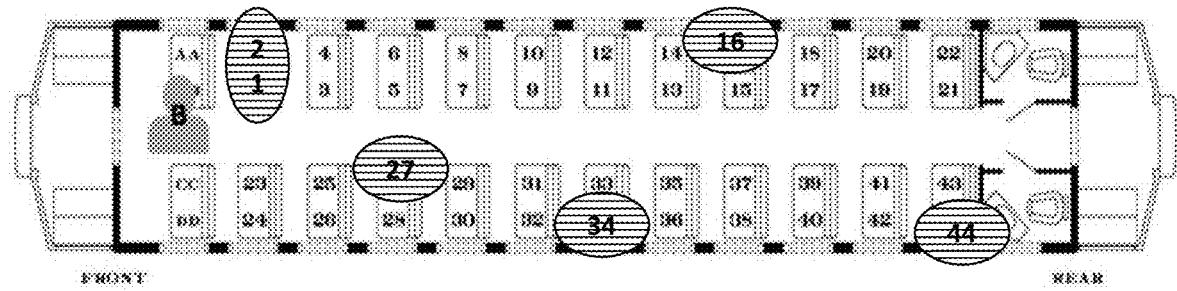
FIG. 3 depicts a seating visualization for passengers on a train showing passengers that the ticket collector needs to check-in, in accordance with an embodiment of the present invention.

FIG. 3 depicts a seating visualization for passengers on a train showing passengers that the ticket collector needs to check-in, in accordance with an embodiment of the present invention.

With reference to FIG. 3, the ticket collector is located at the front of the train seating chart and is depicted by the letter "B". The horizontal line pattern associated with the various rows and seat numbers within the train seating chart designate train passengers that need to be checked-in, but are detected as sitting in a passenger seat within the transit venue.

In exemplary embodiments, the received destination information of the one or more passengers may be color-coded according to destination stations for the associated one or more passengers (e.g., light green for BWI airport passengers, light blue for DC passengers, and so forth), and displayed on seat visualization application 116. In various exemplary embodiments, the seat information may be depicted by various hash marks, line patterns, and any other symbol or pattern within the train seating chart that may clearly depict one or more destinations of one or more passengers.

In additional embodiments, receiving module 132 may be capable of controlling one or more light emitting diodes (LEDs) associated with the one or more seats based on the seat occupancy details of the one or more passengers. For example, a first designated color of the one or more LEDs may correspond to a no checked-in status of the one or more passengers associated with the one or more seats; a second designated color of the one or more LEDs may correspond to a destination information of the one or more passengers associated with the one or more seats; a third designated color of the one or more LEDs may correspond to a social media sentiment of the one or more passengers associated with the one or more seats; and a fourth designated color of the one or more LEDs may correspond to a missed destination of the one or more passengers associated with the one or more seats.

Figure 4:
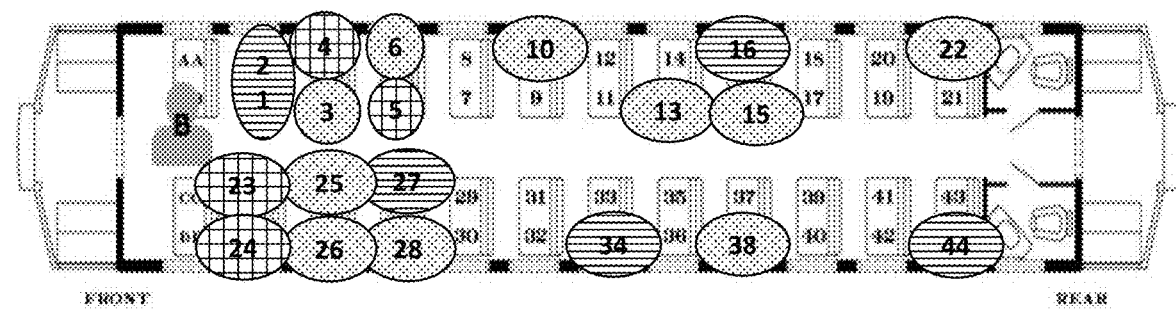
FIG. 4 depicts another seating visualization for passengers on a train showing various destinations of the various checked-in passengers, in accordance with an embodiment of the present invention.

FIG. 4 depicts another seating visualization for passengers on a train showing various destinations of the various checked-in passengers, in accordance with an embodiment of the present invention.

With continued reference to the illustrative example above and FIG. 4, Bob ("B") is the train collector on Anna's train. Bob pulls out his mobile phone (computing device 110) to collect tickets and since the train that Anna is riding on has implemented one embodiment of the proposed invention, Bob can see on his seat visualization application 116 which passengers have already checked-in on the train. Those passengers in seats that are depicted as horizontally-lined pattern seats, on seat visualization application 116, are ones that he still needs to check. In the illustrative example of FIG. 4, those passengers in seats that are depicted as box pattern seats, on seat visualization application 116, are the ones that are paid through BWI airport. Those passengers in seats that are depicted as polka dot pattern seats, on seat visualization application 116, are the ones that are paid through Washington, D.C.

With continued reference to the illustrative example above, Anna checks into her chosen seat by turning on her smart phone's NFC reader 146 and tapping her passenger seat NFC tag 150. Anna's seat immediately lights up with a little blue LED to show the collector that she has checked-in using the proposed invention. Anna's ticket information and seat location are transmitted to receiving module 132 which identifies Anna as paid for a trip through to Washington, D.C. Anna comfortably closes her eyes and begins reciting her speech in her mind without being interrupted for her train ticket by Bob, the ticket collector. However, the passenger seated next to Anna, Carol, has not checked-in to her seat, so her seat LED remains red. Bob notices the red LED that is lit up next to Carol's seat, as well as the horizontally-lined pattern associated with Carol's seat on seat visualization application 116, and knows to ask for her passenger ticket, as he would without the proposed invention. In alternative embodiments, Bob may have the option to manually update the train seating chart, on seat visualization application 116, with Carol's destination information after checking Carol's paper ticket.

In alternative embodiments, the received origination information of the one or more passengers may also be color-coded, according to origination stations for the associated one or more passengers (e.g., dark yellow for Baltimore, light yellow for Washington, D.C., and so forth), and displayed on screen visualization program 116.

With continued reference to FIGS. 1 and 2, updating module 136 includes a set of programming instructions in seat visualization program 130. The set of programming instructions is executable by a processor. Updating module 136 updates the seating chart for the transit venue based on the seat occupancy details of the one or more passengers (step 206).

In exemplary embodiments, updating module 136 may update the seating chart on seat visualization application 116, in real-time, when a passenger changes seats.

Referring back to the illustrative example above, Anna decides to change her seat because it smells funny. Without having to pull out her smart phone again, due to the Bluetooth® network associated with each particular seat, updating module 136 processes Anna's new seat information in real-time.

In alternative embodiments, updating module 136 may provide data about popular and unpopular seating locations on a transit venue. For example, if seats 27 and 28 are not occupied for a week, then perhaps this is an indication that there is a spill, a rip in the seat, or some other issue that has caused passengers to avoid those seats. This data may prompt managers, ticket collectors, or other train personnel to inspect and repair, or identify and predict future issues. This data may be stored locally on server 120 or computing device 110.

In exemplary embodiments, updating module 136 may send an alert to the one or more passengers, via user device 140 over network 102, associated with the one or more seats, that a destination associated with the one or more seats is approaching. The alert to the one or more passengers may include any one or more of the following: a mobile push message, a mobile text message, a flashing light associated with the one or more seats (e.g., an LED) of the one or more passengers, an audible message from a speaker near the one or more seats of the one or more passengers, a vibration from the one or more seats of the one or more passengers, a message on a screen near the one or more seats of the one or more passengers, and any other form of alert known to one of ordinary skill in the art. Additionally, via transit application 142 on their user device 140, the passenger may indicate an alert language preference, when the alert is a written or audible alert, and an alert type preference, when multiple alert types are available.

In additional embodiments, updating module 136 may send an alert to seat visualization application 116 when the one or more passengers associated with the one or more seats do not exit upon reaching the destination information associated with the one or more seats. For example, if a passenger falls asleep, or attempts to ride the train for more stops than they paid for, the ticket collector may see a flashing color dot associated with a seat number on seat visualization application 116 and be prompted to approach the passenger.

Figure 5:
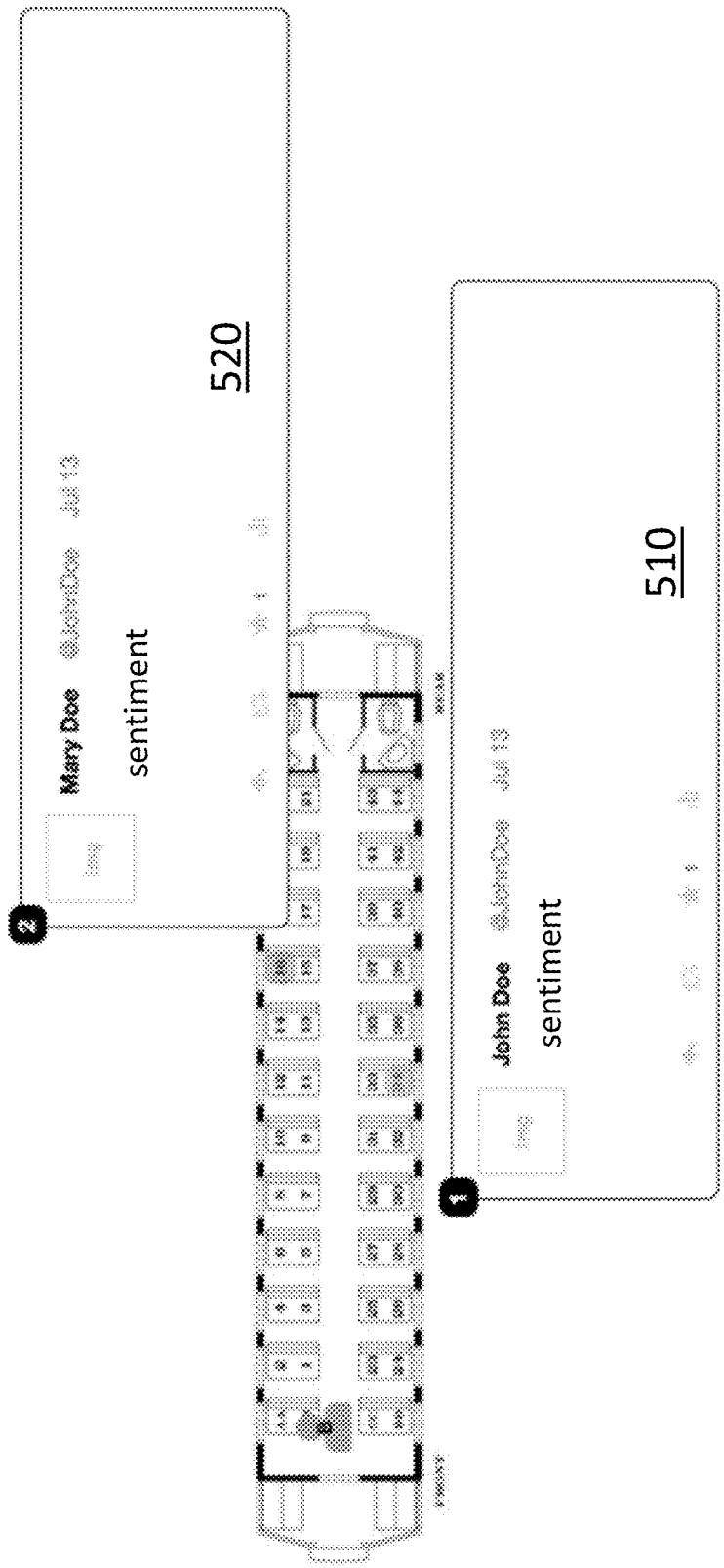
FIG. 5 depicts a seating visualization for passengers on a train, together with expressed sentiments on social media platforms, in accordance with an embodiment of the present invention.

FIG. 5 depicts a seating visualization for passengers on a train, together with expressed social media sentiments of one or more passengers on the train, in accordance with an embodiment of the present invention.

With reference to FIGS. 1 and 5, updating module 136 may receive a social media sentiment of the one or more passengers associated with the one or more seats. For example, if a color dot (or any other alternative indicator of an occupied seat) of a passenger on the seating chart is unknown to the ticket collector, they could click on the color dot associated with the seat number of the passenger to see a key or additional reasoning for the highlighting. The unknown color dot may be a positive or negative social media sentiment published by the passenger, which the ticket collector may be able to view on seat visualization application 116. If the ticket collector sees that someone posted a positive sentiment, like sentiment 510 posted by John Doe, then he may be prompted to go talk to that passenger and thank them for riding the train. If the ticket collector sees that someone posted a negative sentiment, like sentiment 520 posted by Mary Doe, then he may be prompted to go talk to that passenger and ask how to improve their ride experience.

With continued reference to FIGS. 1 and 2, displaying module 138 includes a set of programming instructions in seat visualization program 130. The set of programming instructions is executable by a processor. Displaying module 138 displays the seating chart, together with the seat occupancy details of the one or more passengers, on a computing device (step 208). In exemplary embodiments, displaying module 138 transmits the updated seating chart data to computing device 110 via network 102.

Referring back to the illustrative example above, displaying module 138 displays the updated passenger information for Anna based on her new seat. Bob, the ticket collector, does not need to keep tabs on Anna's location within the train or remember where Anna was sitting, before she changed seats, because he gets a real-time update of Anna's new seat on seat visualization application 116.

Figure 6:
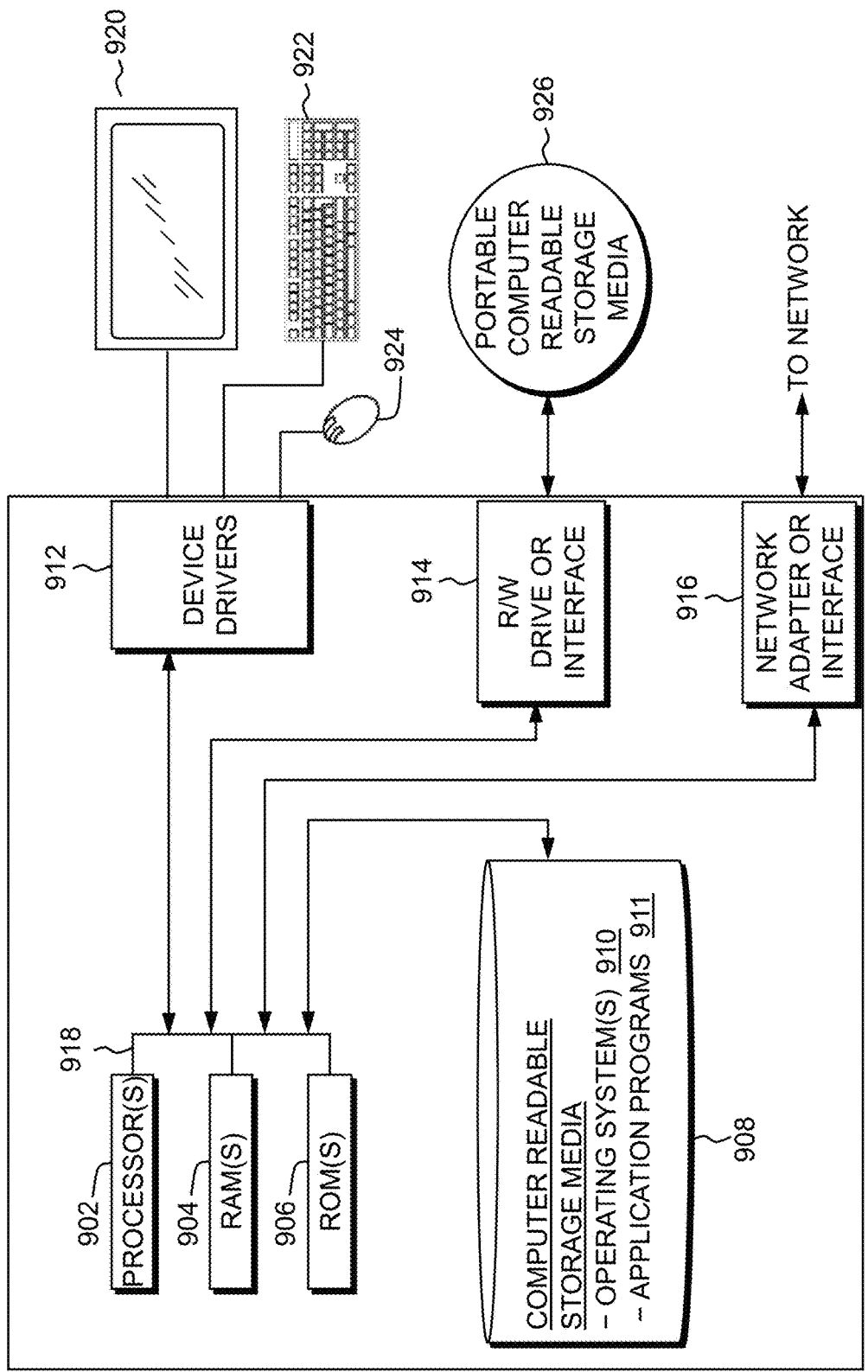
FIG. 6 is a diagram graphically illustrating the hardware components of the seat visualization computing environment of FIG. 1, in accordance with an embodiment of the present invention.

FIG. 6 is a block diagram depicting components of a computing device in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device of FIG. 6 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as seat visualization program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 6 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 6 may also include a network adapter or interface 916, such as a TCP/IP adapter card or wireless communication adapter (such as a 4G wireless communication adapter using OFDMA technology). Application programs 911 on computing device of FIG. 6 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 6 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
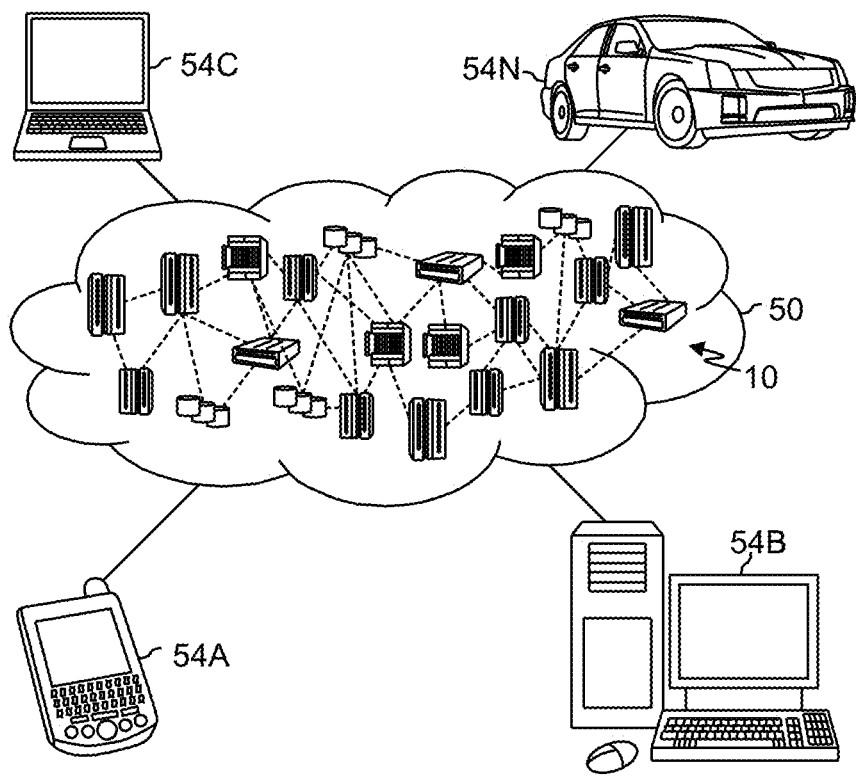
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
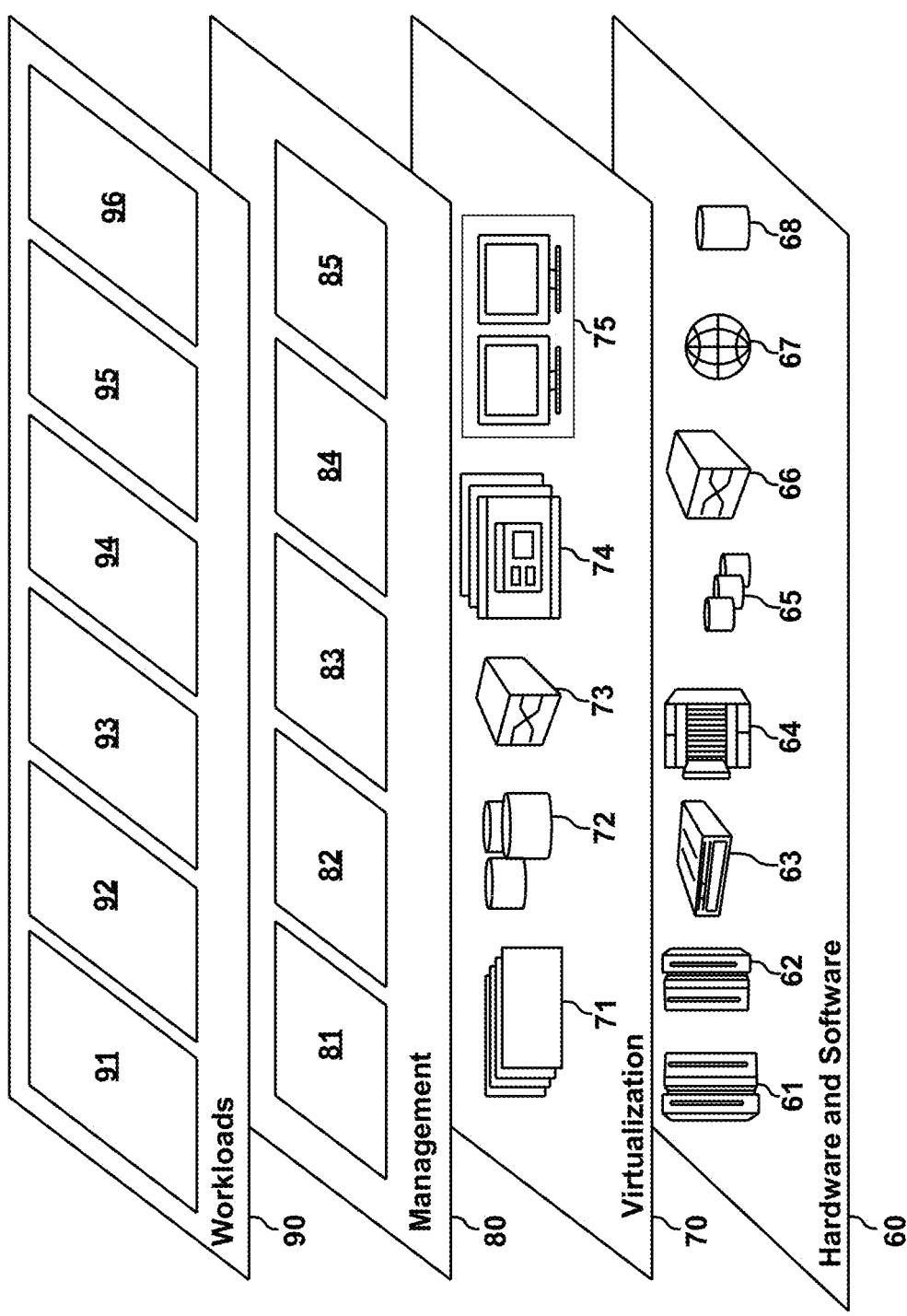
FIG. 8 depicts abstraction model layers of the illustrative cloud computing environment of FIG. 7, in accordance with an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing seat occupancy details of two or more passengers, comprising:
   receiving seat occupancy details of the two or more passengers associated with two or more seats, via two or more user devices associated with each of the two or more passengers, wherein the two or more passengers communicate their respective seat occupancy details, via a wireless receiver associated with each of the two or more seats, wherein the received seat occupancy details for each of the two or more passengers comprise the following: an origination, an intended destination, time until the intended destination, number of remaining stops until the intended destination, missed destination, and no checked-in status;
   alerting a ticket collector that the seats associated with the two or more passengers has been paid for;
   retrieving a seating chart for a transit venue from a database;
   transmitting the received seat occupancy details of the two or more passengers;
   creating a set of distinct graphical visualizations for the two or more passengers, wherein the set includes three or more distinct graphical visualizations and each distinct graphical visualization is associated with at least one of the seat occupancy details of each of the two or more passengers;
   updating the seating chart for the transit venue based on each of the received seat occupancy details of the two or more passengers; and
   displaying the seating chart for the transit venue on a computing device, wherein the displayed seating chart for the transit venue includes, displaying for each seat the set of distinct graphical visualizations for each of the seat occupancy details of the two or more passengers.

2. The computer-implemented method of claim 1, further comprising:
   receiving an alert when the two or more passengers associated with the two or more seats do not exit upon reaching the intended destination.

3. The computer-implemented method of claim 1, further comprising:
   receiving a social media sentiment of the two or more passengers associated with the two or more seats.

4. The computer-implemented method of claim 1, further comprising:
   sending an alert, to the two or more passengers associated with the two or more seats, that the intended destination is approaching.

5. The computer-implemented method of claim 4, wherein the alert to the two or more passengers may comprise any one or more of the following: a mobile push message, a mobile text message, a flashing light associated with each of the seats of the two or more passengers, a vibration from each of the seats of the two or more passengers, a message on a screen associated with each of the seats of the two or more passengers, or an audible message from a speaker associated with each of the seats of the two or more passengers.

6. The computer-implemented method of claim 1, further comprising:

determining that each associated seat, within the seating chart for the transit venue, is occupied by one of the two or more passengers based on weight sensors contained within each associated seat.

7. The computer-implemented method of claim 1, further comprising:
controlling one or more light emitting diodes (LEDs) associated with the seat based on the seat occupancy details of the two or more passengers,
wherein a first designated color of the one or more LEDs corresponds to a no checked-in status of the passenger associated with the seat;
wherein a second designated color of the one or more LEDs corresponds to a destination information of the passenger associated with the seat; and
wherein a third designated color of the one or more LEDs corresponds to a social media sentiment of the passenger associated with the seat; and
wherein a fourth designated color of the one or more LEDs corresponds to a missed destination of the passenger associated with the seat.

8. A computer program product, comprising a non-transitory tangible storage device having program code embodied therewith, the program code executable by a processor of a computer to perform a method for managing seat occupancy details of two or more passengers, the method comprising:
receiving seat occupancy details of the two or more passengers associated with two or more seats, via two or more user devices associated with each of the two or more passengers, wherein the two or more passengers communicate their respective seat occupancy details, via a wireless receiver associated with each of the two or more seats using the two or more user devices associated with the two or more passengers, wherein the received seat occupancy details for each of the two or more passengers comprise the following: an origination, an intended destination, time until the intended destination, number of remaining stops until destination, missed destination, and no checked-in status;
alerting a ticket collector that the seats associated with the two or more passengers has been paid for;
retrieving a seating chart for a transit venue from a database;
transmitting the received seat occupancy details of the two or more passengers;
creating a set of distinct graphical visualizations for the two or more passengers, wherein the set includes three or more distinct graphical visualizations and each distinct graphical visualization is associated with at least one of the seat occupancy details of each of the two or more passengers;
updating the seating chart for the transit venue based on each of the received seat occupancy details of the two or more passengers; and
displaying the seating chart for the transit venue on a computing device, wherein the displayed seating chart for the transit venue includes, displaying for each seat the set of distinct graphical visualizations for each of the seat occupancy details of the two or more passengers.

9. The computer program product of claim 8, further comprising:
receiving an alert when the two or more passengers associated with the two or more seats do not exit upon reaching the intended destination.

10. The computer program product of claim 8, further comprising:
receiving a social media sentiment of the two or more passengers associated with the two or more seats.

11. The computer program product of claim 8, further comprising:
sending an alert, to the two or more passengers associated with the two or more seats, that the intended destination is approaching.

12. A computer system for managing seat occupancy details of two or more passengers, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
receiving seat occupancy details of the two or more passengers associated with two or more seats, via two or more user devices associated with each of the two or more passengers, wherein the two or more passengers communicate their respective seat occupancy details, via a wireless receiver associated with each of the two or more seats using the two or more user devices associated with the two or more passengers, wherein the received seat occupancy details for each of the two or more passengers comprise the following: an origination, an intended destination, time until the intended destination, number of remaining stops until the intended destination, missed destination, and no checked-in status;
alerting a ticket collector that the seats associated with the two or more passengers has been paid for;
retrieving a seating chart for a transit venue from a database;
transmitting the received seat occupancy details of the two or more passengers;
creating a set of distinct graphical visualizations for the two or more passengers, wherein the set includes three or more distinct graphical visualizations and each distinct graphical visualization is associated with at least one of the seat occupancy details of the two or more passengers;
updating the seating chart for the transit venue based on each of the received seat occupancy details of the two or more passengers; and
displaying the seating chart for the transit venue on a computing device, wherein the displayed seating chart for the transit venue includes, displaying for each seat the set of distinct graphical visualizations for each of the seat occupancy details of the two or more passengers.

13. The computer system of claim 12, further comprising:
receiving an alert when the two or more passengers associated with the two or more seats do not exit upon reaching the intended destination.

14. The computer system of claim 12, further comprising:
receiving a social media sentiment of the two or more passengers associated with the two or more seats.

* * * * *